Figure 1:
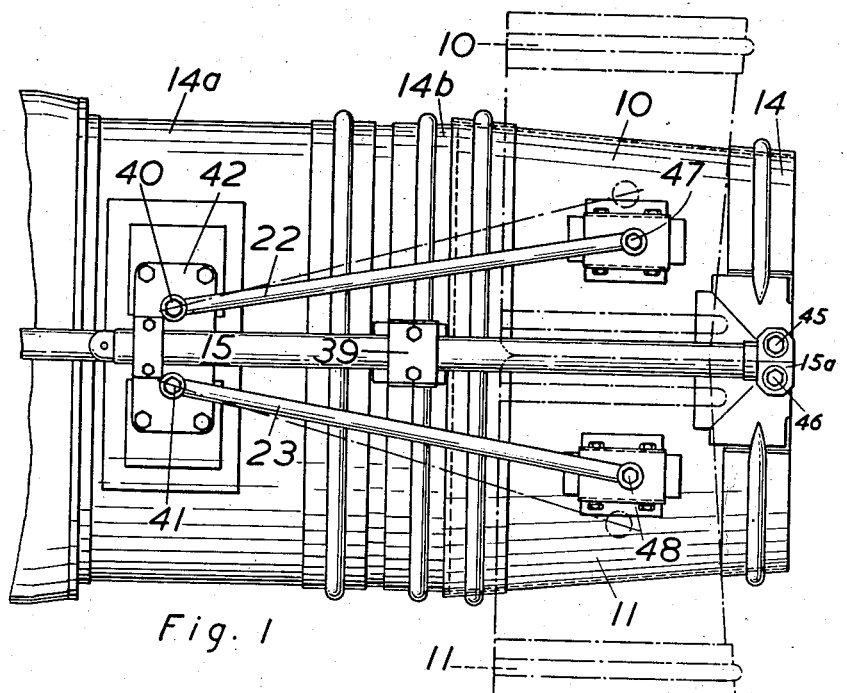

March 10, 1959     A. P. JOHNSTONE     2,876,619
JET SPOILER FOR JET PROPULSION PLANT
Original Filed July 18, 1946

Inventor
ALEXANDER PEARSE JOHNSTONE,
By Robert B. Larson Attorney

United States Patent Office 2,876,619
Patented Mar. 10, 1959

2,876,619

JET SPOILER FOR JET PROPULSION PLANT

Alexander Pearse Johnstone, Frimley, England, assignor to Power Jets (Research and Development) Limited, London, England, a British company Original application July 18, 1946, Serial No. 684,454. Divided and this application June 1, 1953, Serial No. 358,743

5 Claims. (Cl. 60—35.54)

This invention relates to jet reaction devices in which thrust is obtained from the reaction of a stream of ejected fluid. The invention has especial application to jet reaction devices for aircraft propulsion but is not necessarily limited to this application.

An object of the invention is the provision of improved "spoiler" means for "spoiling" or deflecting the jet stream, so as to annul the thrust developed or, if desired, to develop thrust in the reverse direction. There are cases of need for such a device in jet propelled aircraft owing to the pronounced tendency to "float" in landing, due to the absence of propeller drag and when deck or other short-run landing has to be provided for, a device that will not only "kill" the thrust of the jet altogether but will provide an appreciable degree of reversed or braking thrust, may be considered highly desirable. It may also be desirable to deflect and disperse a propulsive jet of an aircraft when the aircraft is stationary on the ground, to avoid inconvenience or damage to persons or objects behind the aircraft, and to relieve brakes and tyres of heavy loads.

Further objects of the invention are to provide a jet spoiler device that will be simple, robust, reliable, easily and rapidly operated without calling for excessive operating forces, and when not in operation will not be exposed to excessive heating from the jet gases nor create excessive drag.

The present invention is a modification of that described in copending application Serial No. 266,923, filed January 15, 1952, now Patent No. 2,715,312, in the name of Eugene Brame.

According to said invention, a controllable jet spoiling device for use in association with a jet pipe and jet reaction nozzle comprises a pair of pivotally mounted jaw members so shaped and having their pivotal connections so disposed that in the non-spoiling position they fit round the end region of the jet pipe and in the spoiling position they form a baffle disposed in such relation to the open end of the said nozzle as to deflect a jet stream issuing from said nozzle.

According to the present invention the jaws themselves, in the non-spoiling position, form the jet reaction nozzle.

In order to prevent a rise in temperature of the exhaust jet gases and jet pipe which is often undesirable, at least in the case of aircraft, in the spoiling position the baffle or that part thereof nearest the jet pipe may be arranged to be at a distance from the final nozzle at least equal to the final nozzle diameter. As a preferred alternative, in order to eliminate excessive length in the baffle supporting structure, the jaws may be so adapted that the area of the final nozzle in the spoiling position is greater than that in the non-spoiling position.

These jams are preferably operated by push-pull rods movable in the axial direction of the jet and located close to the nozzle walls; and the said rods may be operated by electrically driven screw jacks or by hydraulic rams, or by any other convenient mechanism.

The nature of the invention and certain further features thereof will be more fully understood from the following description, having reference to the accompanying partly diagrammatic drawings and illustrating, by way of example, one embodiment of the invention.

Figure 2:
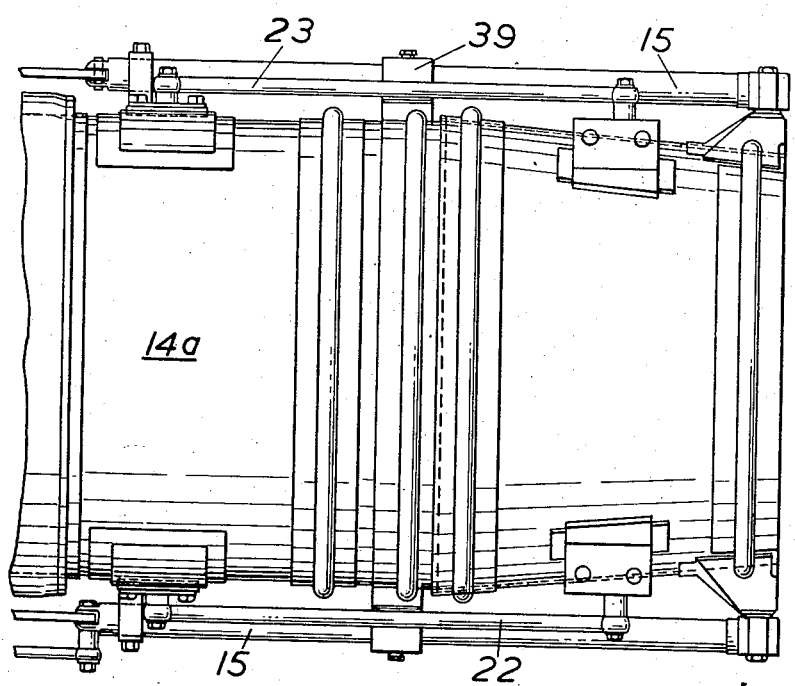

In the drawings:

Fig. 1 illustrates in plan and Fig. 2 in elevation, one form of the invention.

In the form of Figs. 1 and 2, the device is applied to the final propelling nozzle 14 of a jet-pipe 14a, and comprises mainly a pair of so-called jaws 10, 11 which are semi-circular section. Each jaw is constituted by an almost semi-cylindrical structure of sheet-metal, appropriately stiffened, and in their non-spoiling position (shown in full lines) they fit together to form a rearward continuation of the jet pipe 14a and themselves form the final jet reaction nozzle 14.

Jaws 10, 11 are carried pivotally by upper and lower links 22, 23, which act as radius rods anchored pivotally at 40, 41 to a block 42 which is rigid with the jet pipe 14a and to the jaws at 47, 48 respectively. The jaws 10, 11 are interconnected at their rearward extremities and connected to an operating push-pull rod 15, through a fitting 15A which is rigid with rod 15 and to which the jaws 10, 11 are pivoted at 45, 46 respectively.

A guide block 39 is rigid with the jet pipe 14a and serves to prevent the rod 15 from moving in a lateral direction, said rod moving in an aperture in said block.

The rod 15 is operated by any convenient means such as an electrical or hydraulic jack and when the said rod is moved forwardly the jaws 10, 11, are opened to the position shown in dotted lines. In this position the jet stream is diverted by the jaws in the direction shown by the arrows.

As will be seen from the drawings the walls of the jaws 10, 11 converge rearwardly so that the diameter of the final nozzle 14 formed by the said jaws in the normal closed position is less than the final nozzle 14b which becomes the operative end of jet pipe 14a when the jaws 10, 11, are opened into the spoiling position and in this way a temperature rise of the jet exhaust gases is prevented.

By suitably shaping the walls of the jaws 10, 11, the deflecting surfaces in the spoiling position may be arranged to have a rearward curvature so that if required a reverse thrust can be obtained.

The present application is a continuation of application, Serial No. 684,454, filed July 18, 1946, now abandoned.

I claim:

1. In an aircraft jet propulsion power plant having a jet pipe and nozzle for the rearward discharge of a propulsive jet stream, a jet spoiler comprising a hollow elongated substantially circular-section tubular member having its upstream end abutting with the rearward end of the jet pipe and forming a rearward coaxial extension thereof, said tubular member being bisected in an axial plane and the two parts thereof having a rearward common diameter lying in said plane and being pivotally jointed together where they meet at their rearward extremities on said plane, each part being pivotable about substantially said common diameter in that plane from said position in which they form said tubular member through 90° to a spoiling position in which they lie end to end transverse to the jet stream with their concave sides facing upstream, and linkage mechanism connected to said parts and operable to move them between said two positions.

2. In an aircraft jet propulsion power plant having a jet pipe and nozzle for the rearward discharge of a propulsive jet stream, a jet spoiler comprising a hollow tapered substantially circular-section tubular member disposed coaxially with and forming a rearward extension of the jet pipe, and having its larger end abutting with the rearward end of the jet pipe and its smaller end directed rearwardly to constitute the jet nozzle, said tubular member being bisected in an axial plane and the two parts thereof having a rearward common diameter lying in said plane and being pivotally jointed together where they meet at their rearward extremities on said plane, each part being pivotable about substantially said common diameter in that plane from said position in which they form said tubular member through 90° to a spoiling position in which they lie end to end transverse to the jet stream with their concave sides facing upstream, and linkage mechanism connected to said parts and operable to move them between said two positions.

3. In an aircraft jet propulsion power plant having a jet pipe for the rearward discharge of a propulsive jet stream, a jet spoiler comprising a hollow elongated substantially circular section tubular member having, in its non-spoiling position, its upstream end abutting with the rearward end of the jet pipe and forming a rearward coaxial extension thereof, said tubular member being bisected in an axial plane to form two separable parts of substantially semi-circular cross-section, each of said parts being rotatably mounted relative to said jet pipe for rotation about a point spaced rearwardly from said rearward end of the jet pipe, and linkage mechanism connected to said parts and operable to rotate said parts between said non-spoiling position and a spoiling position in which said parts lie transversely across the jet stream with their concave sides facing upstream.

4. In an aircraft jet propulsion power plant having a jet pipe for the rearward discharge of a propulsive jet stream, a jet spoiler comprising a hollow elongated substantially circular section tubular member having, in its non-spoiling position, its upstream end abutting with the rearward end of the jet pipe and forming a rearward coaxial extension thereof, said tubular member being bisected in an axial plane to form two separable parts of substantially semi-circular cross-section, two links each pivotally mounted at one end relative to the jet pipe and each pivotally connected at the other end one to each of said parts at point spaced rearwardly from said rearward end of the jet pipe, and linkage mechanism connected to said parts and operable to rotate said parts between said non-spoiling position and a spoiling position in which said parts lie transversely across the jet stream with their concave sides facing upstream.

5. In an aircraft jet propulsion power plant having a jet pipe for the rearward discharge of a propulsive jet stream, a jet spoiler comprising a hollow elongated substantially circular section tubular member having its upstream end abutting with the rearward end of the jet pipe and forming a rearward coaxial extension thereof, said member comprising two spoiler members which are curved in cross-section taken normal to the axis of said tubular member and in their non-spoiling position are symmetrically disposed one on each side of the axial plane of the jet stream and form parts of said tubular member, means mounting each spoiler member for pivotal movement about an axis spaced rearwardly from said rearward end of the jet pipe transverse to the jet stream axis and substantially in said axial plane, said spoiler members being pivotable each about its said axis from said non-spoiling position to a spoiling position in which they lie end to end transversely to the jet stream axis with their concave sides facing upstream, and linkage mechanism connected to the spoiler members and operable to move them in unison between said two positions.

References Cited in the file of this patent
UNITED STATES PATENTS

| | | |
|---|---|---|
| 1,415,705 | Rees | May 9, 1922 |
| 1,572,812 | Rees | Feb. 9, 1926 |
| 2,551,372 | Haltenberger | May 1, 1951 |
| 2,620,622 | Lundberg | Dec. 9, 1952 |
| 2,715,312 | Brame | Aug. 11, 1955 |

OTHER REFERENCES

Aircraft Engineering, issue of February 1946, page 55.